(12) United States Patent
Imagawa et al.

(10) Patent No.: US 7,133,658 B2
(45) Date of Patent: Nov. 7, 2006

(54) METHOD AND APPARATUS FOR IMAGE PROCESSING

(75) Inventors: Kazuyuki Imagawa, Fukuoka (JP); Katsuhiro Iwasa, Iizuka (JP); Takaaki Nishi, Iizuka (JP); Eiji Fukumiya, Iizuka (JP); Hideaki Matsuo, Yokohama (JP); Tomonori Kataoka, Oonojyo (JP); Satoshi Kajita, Yukuhashi (JP); Ikuo Fuchigami, Kasuya-Gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 237 days.

(21) Appl. No.: 10/698,435

(22) Filed: Nov. 3, 2003

(65) Prior Publication Data
US 2004/0131278 A1    Jul. 8, 2004

(30) Foreign Application Priority Data
Nov. 7, 2002    (JP)    ............................. 2002-324443

(51) Int. Cl.
H04Q 7/20    (2006.01)
(52) U.S. Cl. ................ 455/403; 455/414.1; 455/556.2; 382/284
(58) Field of Classification Search ................ 382/284, 382/216, 117, 118, 100; 358/537; 455/403, 455/414.1, 456.6, 550.1, 556.1, 556.2
See application file for complete search history.

(56) References Cited

U.S. PATENT DOCUMENTS

| | | | |
|---|---|---|---|
| 6,181,805 B1 * | 1/2001 | Koike et al. ................ | 382/118 |
| 6,657,538 B1 * | 12/2003 | Ritter ........................ | 340/5.81 |
| 6,661,906 B1 * | 12/2003 | Kawade et al. ............. | 382/118 |
| 6,788,928 B1 * | 9/2004 | Kohinata et al. ........... | 455/411 |
| 6,792,143 B1 * | 9/2004 | Harmovaara ................ | 382/189 |
| 6,801,663 B1 * | 10/2004 | Matsushita et al. ......... | 382/236 |
| 2002/0097250 A1 | 7/2002 | Fukushima et al. | |
| 2005/0153679 A1 * | 7/2005 | Kim .......................... | 455/403 |

FOREIGN PATENT DOCUMENTS

| | | |
|---|---|---|
| EP | 0849707 | 6/1998 |
| EP | 1095676 | 5/2001 |
| EP | 001434170 A2 * | 10/2005 |
| EP | 001424652 A2 * | 11/2005 |
| JP | 2000-22929 | 1/2000 |
| WO | 02/03022 | 1/2002 |

OTHER PUBLICATIONS

Rutledge, Lloyd, "SMIL 2.0: XML for Web Multimedia", IEEE Internet Computing, IEEE Service Center, New York, NY, US, vol. 5, No. 5, Sep. 2001, pp. 78-84.

* cited by examiner

Primary Examiner—CongVan Tran
(74) Attorney, Agent, or Firm—Wenderoth, Lind & Ponack, L.L.P.

(57) ABSTRACT

The position of a body part area for a personal image in an input image is detected. According to the position of the detected body part area, the position of the origin of a coordinate system for an ornament image is defined. Based on the position of the defined origin, an ornament-arranged input image is outputted. When the personal image moves in the input image, the ornament image also moves by following the movement of the personal image. Even when both the personal image and ornament image move, the ornament image can be made not to interfere with the personal image. Therefore, the personal image can be clearly displayed. Moreover, the input image can be made to look more interesting by synchronizing the movement of the ornament image with the movement of the personal image.

17 Claims, 12 Drawing Sheets

Fig. 4(a)
```
<SMIL>
 <head>
    <layout> ...
    </layout>
 </head>
 <body>
    <par>
    <video src="face.rm">
    <animation src="star.swf">
    </par>
 </body>
</smil>
```
"result.smil"
Fig. 4(b)
"face.rm"
Fig. 4(c)
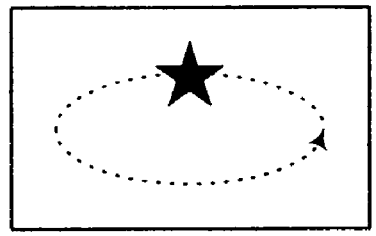
"star.swf"

METHOD AND APPARATUS FOR IMAGE PROCESSING

BACKGROUND OF THE INVENTION

1. Field of the Invention

The present invention relates to an image processing apparatus built into a communication device (for example, a TV phone, a TV conference system, a video mail system, a video chat system, an intercom, etc.) for handling image data. More particularly, the present invention relates to an image processing apparatus for editing a personal image (for example, a face image of a user, a whole-body image of the user, etc.).

2. Description of the Related Art

There is an amusement apparatus that prints and outputs a personal image of the user to various kinds of print media. The amusement apparatus overlaps a frame of ornaments (for example, a picture, a pattern, etc.) on the personal image of the user to make a composite image, and prints and outputs the composite image to a print media (for example, seal etc.).

The amusement apparatus, however, does not have, in itself, a function to adjust a positional relationship of the personal image and the ornaments. Therefore, even if the user has arranged the personal image to fit in the ornament frame, the ornament may overlap with the personal image, so that the ornament hides a part of the face (face part) of the user and/or a part of the head (head part) of the user, and as a result, the personal image becomes unclear.

Considering this point, a first reference (published Japanese Patent Application Laid-Open No. 2000-22929) discloses a technique that adds ornaments to a personal image, while making an ornament not overlap with a body part of the personal image, especially, a predetermined body part corresponding to a face and head.

Recently, a camera-built-in cellular phone has been put in practical use. The cellular phone has a function to overlap a frame of ornaments on a personal image to make a composite image and a function to transmit the composite image. If a transmitter uses such a camera-built-in cellular phone, a receiver can enjoy seeing the picture that the transmitter has edited.

The first reference assumes that ornaments do not move. According to the technique disclosed by the first reference, ornaments are added to a personal image such that the ornaments do not overlap with a body part of the personal image, especially, a predetermined body part area corresponding to a face and head.

Consideration of the first reference may be appropriate, since, in the first reference, the output is designated only to a printer that prints the composite image to a print media and an image once printed on the print media is rarely edited again.

However, the camera-built-in cellular phones mentioned above may have widespread use. In one of these cellular phones, a composite image is displayed on a display, without being printed to a print media. In the future, the user of one of the above-mentioned cellular phones will think that he/she wants to move ornaments in order to obtain more pleasure.

However, in the prior art, adding ornaments which do not move to a personal image which also does not move is only taken into consideration. Adding ornaments which move to the personal image is not taken into consideration at all in the prior art. For this reason, if the prior art is simply applied to a personal image which moves, the personal image and the ornaments may interfere with each other. As a result, the composite image becomes unclear and does not look more interesting.

OBJECTS AND SUMMARY OF THE INVENTION

An object of the present invention is therefore to provide an image processing method by which a personal image can be displayed more clearly, making the image look more interesting, and an art related thereto.

A first aspect of the present invention provides an image processing method comprising: detecting a position of a body part area in an input image; locating a coordinate system of an ornament image according to the detected position of the body part area in the input image; and outputting an ornament-arranged input image, based on the located coordinate system of the ornament image.

According to the method described above, when a person photographic object moves in an input image, an ornament can be moved according to the movement of the person photographic object.

A second aspect of the present invention provides an image processing method as defined in the first aspect, wherein the outputting comprises outputting an image data of the ornament-drawn input image.

According to the method described above, it is not necessary to compose the input image and the ornament in a destination to which the image is outputted.

A third aspect of the present invention provides an image processing method as defined in the first aspect, wherein the outputting comprises outputting an image data relating the ornament image to the input image.

According to the method described above, it is easy to restore the input image in a destination to which the image is outputted, and it is convenient.

A fourth aspect of the present invention provides an image processing method as defined in the third aspect, wherein the ornament image and the input image are related by using a meta file, which administrates ornament information and which is a different file from a file containing ornament image data.

According to the method described above, it is possible to relate the input image to the ornament image concisely.

A fifth aspect of the present invention provides an image processing method as defined in the fourth aspect, wherein a form of the meta file is SMIL (Synchronized Multimedia Integration Language).

According to the method described above, relating the input image to the ornament image can be easily performed.

A sixth aspect of the present invention provides an image processing method comprising: detecting a size of a body part area in an input image; scaling a coordinate system of an ornament image according to the detected size of the body part area; and outputting an ornament-arranged input image, based on the scaled coordinate system of the ornament image.

According to the method described above, when a person photographic object gets closer to an image pick-up device, both the size and movement path of the ornament image become larger. On the other hand, when the person photographic object moves away from the image pick-up device, both the size and movement path of the ornament image become smaller. Thereby, it is possible to make the ornament image as if it is following the person photographic object that moves back and forth.

A seventh aspect of the present invention provides an image processing method comprising: detecting a rotation amount of a body part area, where the rotation is in-plane of an input image; defining a rotation amount of a coordinate system of an ornament image according to the detected rotation amount of the body part area; and outputting an ornament-arranged input image, based on the defined rotation amount of the coordinate system of the ornament image.

According to the method described above, when a face is leaned aside, the ornament image itself and the movement path of the ornament image can be leaned correspondingly. Therefore, it is possible to make the ornament image appear as if it is following the person photographic object that rotates in-plane of the input image.

An eighth aspect of the present invention provides an image processing method comprising: detecting a rotation amount of a body part area, where the rotation is off-plane of an input image; defining a rotation amount of a coordinate system of an ornament image according to the detected rotation amount of the body part area; and outputting an ornament-arranged input image, based on the defined rotation amount of the coordinate system of the ornament image.

According to the method described above, when a person does a "right-about", the ornament image and the movement path of the ornament image can be transformed according to the rotation of the person. Therefore, it is possible to make the ornament appear as if it is following the person photographic object that rotates off-plane of the input image.

A ninth aspect of the present invention provides an image processing method comprising: detecting a body part area in an input image; defining opacity of an ornament image, where the opacity of the ornament image in a foreground area with respect to the detected body part area is different from the opacity of the ornament image in a background area of the ornament image with respect to the detected body part area; and outputting an ornament-arranged input image, based on the defined opacity of the ornament image.

According to the method described above, when the movement path of the ornament image comes to the back of the body part area, the ornament image can be hidden. Therefore, it is possible to make the ornament appear as if it is surrounding the body part area and moving in three directions about the body part area.

A tenth aspect of the present invention provides an image processing method as defined in the first aspect, wherein, when an ornament image collides with a body part area, a moving direction of the ornament image is altered so as to move the ornament image away from the body part area.

According to the method described above, a motion like reflection can be given to the ornament image, when the ornament image collides with the body part area.

An eleventh aspect of the present invention provides an image processing method as defined in the first aspect, wherein a body part area is a face part area of a person as a photographic object.

In the method described above, an image in which a face area is chosen as the body part area can be more interesting, since the face vividly shows the person's intention and feeling.

The above and other objects, features and advantages of the present invention will become apparent from the following description when read in conjunction with the accompanying drawings, in which like reference numerals designate the same elements.

BRIEF DESCRIPTION OF THE DRAWINGS

FIG. 4 (*a*) is an illustration showing a meta file according to the first embodiment of the present invention;

FIG. 4 (*b*) is an illustration showing an input image file according to the first embodiment of the present invention;

FIG. 4 (*c*) is an illustration showing an ornament file according to the first embodiment of the present invention;

FIG. 16 (*b*) is an explanatory diagram, showing an anchor point according to the first embodiment of the present invention;

FIG. 16 (*c*) is an illustration showing a composite image according to the first embodiment of the present invention;

DETAILED DESCRIPTION OF THE PREFERRED EMBODIMENTS

Hereinafter, a description is given of embodiments of the present invention with reference to the accompanying drawings.

Prior to a detailed description of the construction of the embodiments of the present invention, important terms used hereinafter are explained.

A "personal image" is an image containing a part or a whole image of a person. Therefore, the image may be a whole-body image, a face image, an image of a sight of the person's back, or the upper half of the body. The image may also be taken with two or more people. Any kind of patterns, such as scenery and a design other than a person, may comprise a background.

A "body part" means a part of a person's body. The part of the person's body is included in the body part, when the part can be recognized as the part of the person's body, even when the body part is invisible because the skin of the body part is equipped with dress, a hat, or shoes, for example. Therefore, a face is a body part and a head is also a body part. An eye, a nose, a mouth, an ear, eyebrows, hair, a neck, the upper half of the body with dress, a hand, an arm, a leg, feet with shoes, a head with a hat, and eyes with glasses are also body parts.

A "body part area" is an area defined as an area which the body part occupies in the personal image. The body part area may include, within itself, a part that is not the body part, and may be an area that is located inside the body part.

Suppose that the body part is a face. In this case, the body part area may include an area in the circumference of the face, or the body part area may be a minimum-sized rectangle surrounding eyes, a mouth, and a nose, but not containing a forehead and ears.

An "ornament" is an image pattern to be added. The image pattern may be an image pattern that is stored in advance, or may be an image pattern that is generated with computer graphics technology. The image pattern may be a pattern of a character, a pattern of a symbol, and a pattern of a figure.

Figure 1:
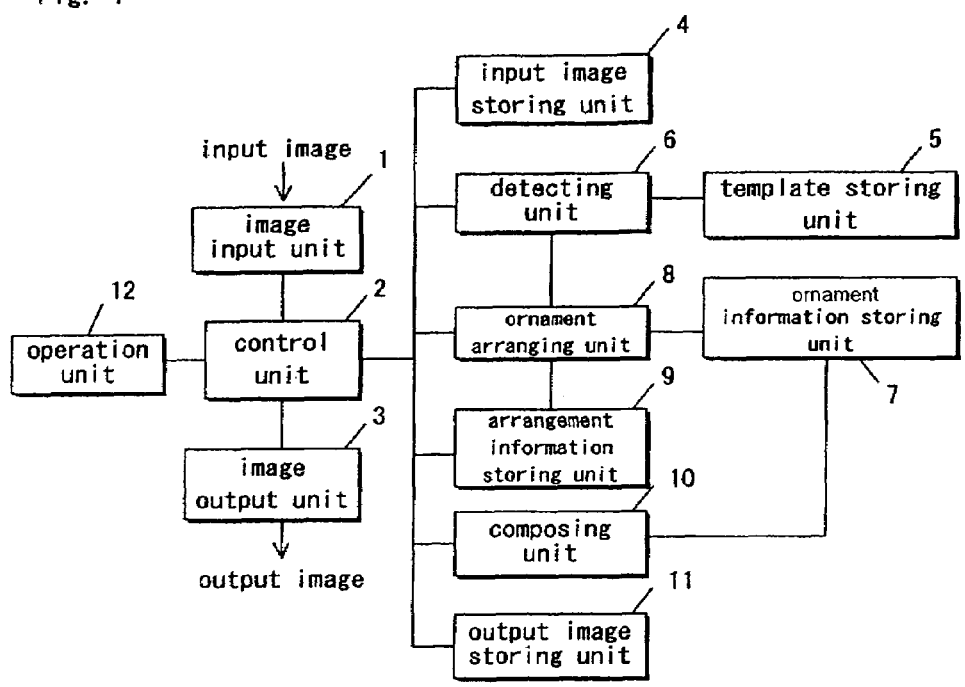
FIG. 1 is a functional block diagram illustrating how an image processing apparatus functions according to the first embodiment of the present invention.

FIG. 1 is a block diagram illustrating how the image processing apparatus functions according to the first embodiment of the present invention. As shown in FIG. 1, the image processing apparatus of the present embodiment has the following components.

An image input unit 1 acquires an input image. In the present embodiment, the input image contains a personal image which is permitted to move. The input image generally means an image for one frame of a moving picture.

The input image may be an image data immediately after being photographed with a camera, encoded data according to coding methods, such as MPEG after photographing (the encoded data could be loaded from a recording medium or received from a communication device), or an image data obtained by decoding the encoded data.

Figure 5:
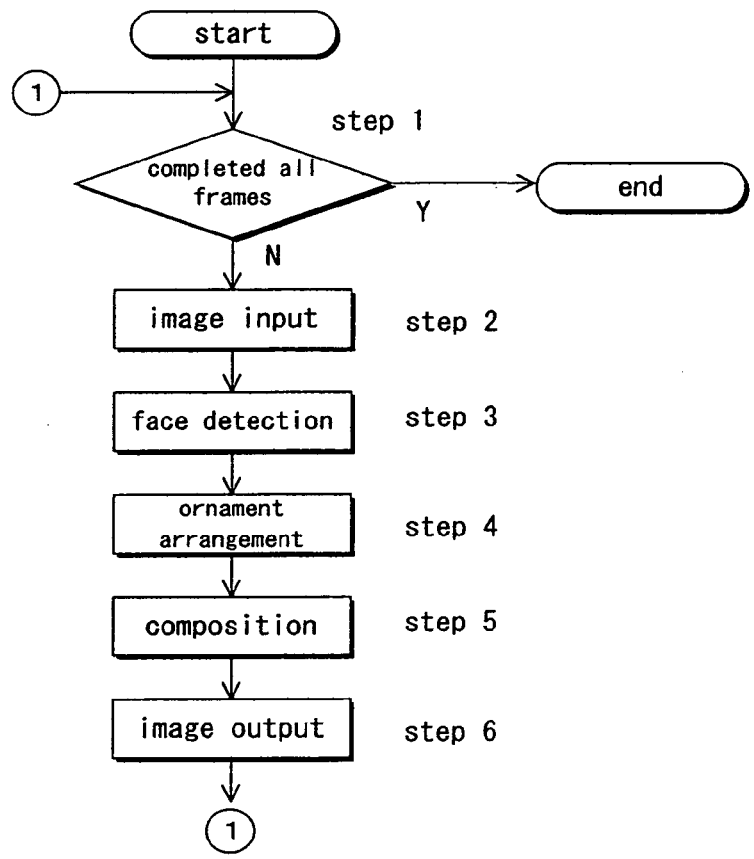
FIG. 5 is a flowchart illustrating processes which are performed by the image processing apparatus according to the first embodiment of the present invention.

A control unit 2 controls each element shown in FIG. 1 according to the flow chart of FIG. 5.

An image output unit 3 outputs an image that is a composite of the input image and the ornament. The output image may be displayed on a display device, or may be encoded according to the above-mentioned coding method, and stored in a recording medium, or may be transmitted by other communication devices.

An input image storing unit 4 stores an input image that the image input unit 1 acquired.

A template storing unit 5 stores templates of a body part area. Hereinafter, a face area is regarded as a body part area in the present embodiment.

Figure 6A:
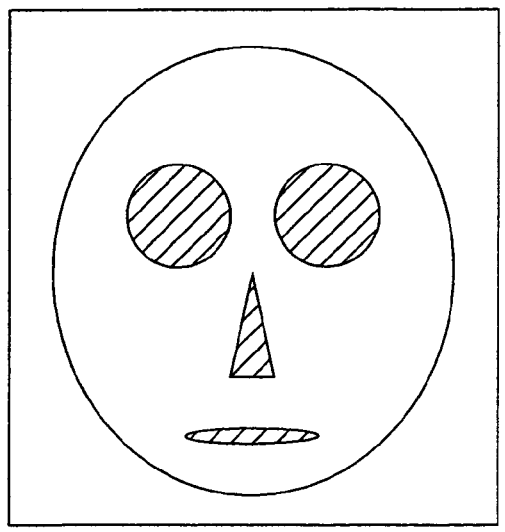
FIGS. 6 (*a*) to (*c*) are illustrations showing templates according to the first embodiment of the present invention.
Figure 6B:
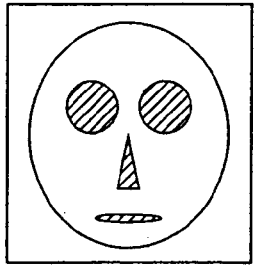
Figure 6C:

As shown in FIGS. 6 (*a*), (*b*), and (*c*), templates made by each modeled outline of face parts (a head, eyes, a nose, and a mouth) are prepared in different sizes for use.

Figure 7A:
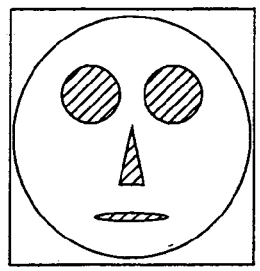
FIGS. 7 (*a*) to (*c*) are illustrations showing the templates according to the first embodiment of the present invention.
Figure 7B:
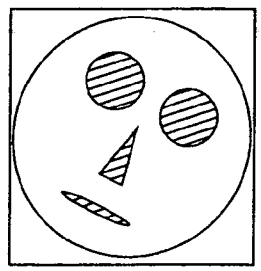
Figure 7C:
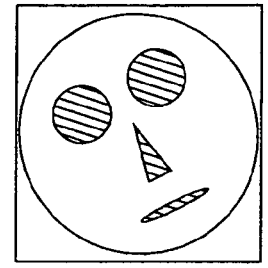

As shown in FIGS. 7 (*b*) and (*c*), templates with a certain in-plane rotation amount of an input image are used, besides the template of a basic position as shown in FIG. 7 (*a*). Thereby, the inclination of the face by rotation can be detected.

Figure 8A:
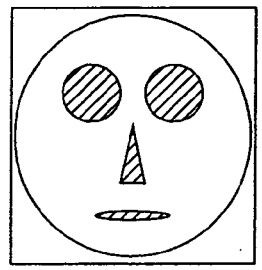
FIGS. 8 (*a*) to (*c*) are illustrations showing the templates according to the first embodiment of the present invention.
Figure 8B:
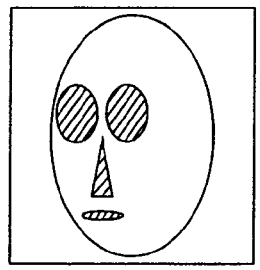
Figure 8C:
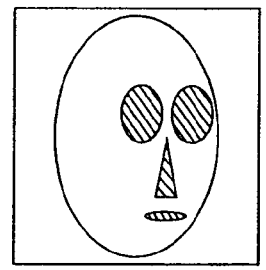

As shown in FIGS. 8 (*b*) and (*c*), templates with a certain off-plane rotation amount of an input image are used, besides the template of a basic position as shown in FIG. 8 (*a*). Thereby, the direction of the face can be detected when the direction of the face differs from the basic position (when the normal vector passing through the center of the face is not orthogonal to the plane of an input image).

Using the templates of the template storing unit 5, a detecting unit 6 shown in FIG. 1 detects a body part area from the input image that is stored by the input image storing unit 4.

Figure 9:
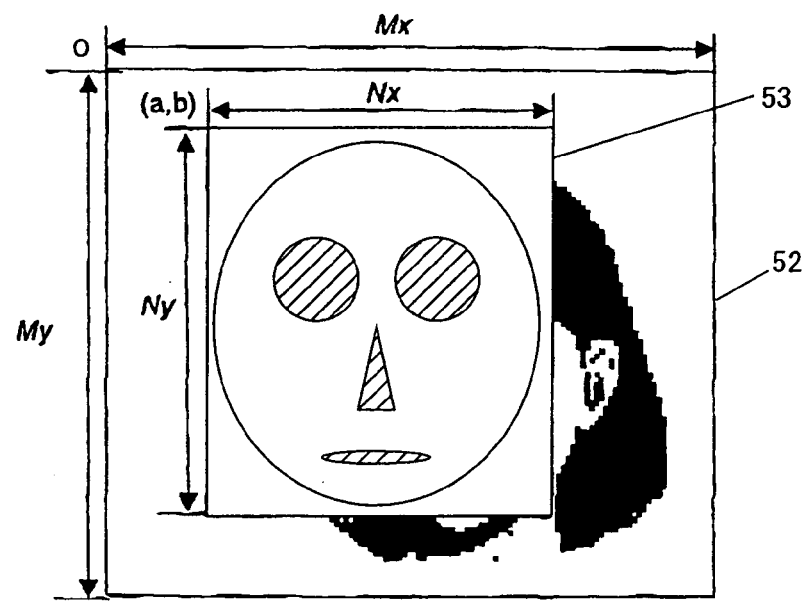
FIG. 9 is an explanatory diagram illustrating pattern matching according to the first embodiment of the present invention.

As shown in FIG. 9, the detecting unit 6 extracts an edge component, by filtering the input image stored in the input image storing unit 4 with a differential filter. Moreover, the detecting unit 6 selects a template 53 from the template storing unit 5, and performs pattern matching by using the selected template 53 and the edge component.

The pattern matching is a processing which moves the template 53 (Nx*Ny pixels) over a search area (Mx−Nx+1) (My−Ny+1) in an input image (Mx*My pixels) which is larger than the template, and searches the upper left position (a, b) of the template at which a residual R given by the following equation becomes minimum. Here, the symbol "*" indicates multiplication.

$$R(a, b) = \sum_{m_y=0}^{N_y-1} \sum_{m_x=0}^{N_x-1} |I_{(a,b)}(m_x, m_y) - T(m_x, m_y)| \quad \text{[Equation 1]}$$

In Equation 1, I (a, b) (mx, my) is a partial image of an input image, and T (mx, my) is an image of the template 53.

Instead of Equation 1, the upper left position (a, b) of the template may be searched by calculating a cross-correlation coefficient C defined by Equation 2, and finding a maximum value for the cross-correlation coefficient C.

$$C(a, b) = \sum_{m_y=0}^{N_y-1} \sum_{m_x=0}^{N_x-1} \frac{\{I(a, b)(m_x, m_y) - \bar{I}\}\{T(m_x, m_y) - \bar{T}\}}{\sqrt{I_{\sigma_{ab}} T_\sigma}} \quad \text{[Equation 2]}$$

$$\bar{I} = \frac{1}{N_x N_y} \sum_{m_y=0}^{N_y-1} \sum_{m_x=0}^{N_x-1} I_{(a,b)}(m_x, m_y)$$

$$\bar{T} = \frac{1}{N_x N_y} \sum_{m_y=0}^{N_y-1} \sum_{m_x=0}^{N_x-1} T(m_x, m_y)$$

$$I_{\sigma_{ab}} = \frac{1}{N_x N_y} \sum_{m_y=0}^{N_y-1} \sum_{m_x=0}^{N_x-1} \{I_{(a,b)}(m_x, m_y) - \bar{I}\}^2$$

$$T_\sigma = \frac{1}{N_x N_y} \sum_{m_y=0}^{N_y-1} \sum_{m_x=0}^{N_x-1} \{T(m_1, n_1) - \bar{T}\}^2$$

The detecting unit 6 uses various kinds of templates shown in FIG. 6, FIG. 7, and FIG. 8. When the detecting unit 6 uses Equation 1, the detecting unit 6 finds a template with which the residual R becomes minimum. When the detecting unit 6 uses Equation 2, the detecting unit 6 finds a template with which the correlation coefficient C becomes maximum. The detecting unit 6 regards the values of position, size, inclination, and direction of the matched template as the values of position, size, inclination, and direction of the face image of the input image.

In the case of a face image, the transition of the position, the size, the inclination, and the direction of the face may be obtained by performing the same processing for every frame or every several frames.

When more than one face exist in the input image, the detecting unit 6 detects, as the face part area of a second person, a position of the lowest residual R or the highest correlation coefficient C within the input image area from which the already detected face part area as the first person is excluded.

Similarly, for a face after a third person and so on, the detecting unit 6 detects repeatedly, while setting up the low position of the residual R and the high position of the correlation coefficient C as the face part area in the area except for the detected face part areas, until the residual R becomes larger than a previously defined threshold or until the correlation coefficient C becomes smaller than a previously defined threshold. Thereby, a face part area for two or more people is detectable.

The above-mentioned detection does not need to always be performed for all the values. The detection of values except for the position and size of the face area may be optional.

In FIG. 1, an ornament information storing unit 7 stores ornament information. The ornament information is explained with reference to FIG. 10.

Figure 10A:
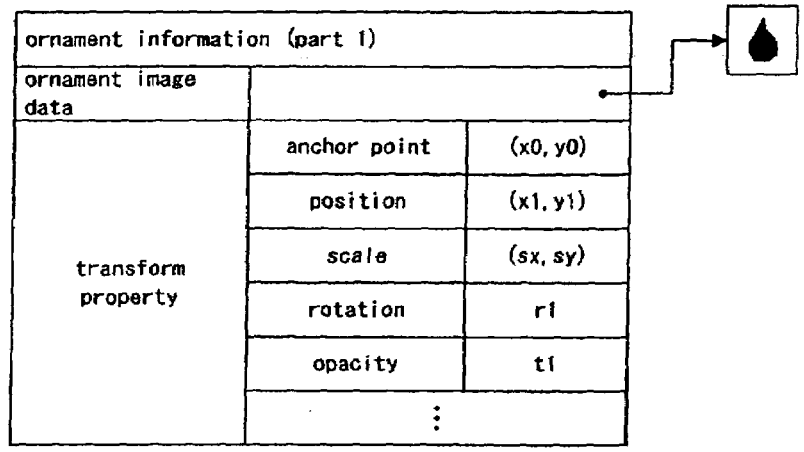
FIGS. 10 (*a*) and (*b*) are block diagrams illustrating the ornament information according to the first embodiment of the present invention.
Figure 10B:
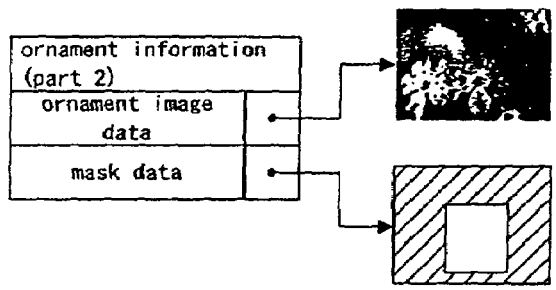

In an example (ornament information no. 1) shown in FIG. 10 (*a*), the ornament information consists of the ornament image data and a transform property, where the ornament image data is related to the transform property.

In the field of the "ornament image data", the ornament image data itself or an ID or a pointer which indicates the ornament image data itself is stored. As illustrated in FIG. 10 (*a*), the ornament image data may consist of only the image data, or have additional attributes (ex. behavior in a collision etc.).

Stored in the field of the "transform property" is information pertaining to how the ornament is moved with regard to the ornament layer and how the ornament layer is overlapped on the input image.

Specifically, the ornament is defined on a local coordinate system (let an anchor point be the origin) by the transform property, where the local coordinate system is different from the coordinate system of the input image. The local coordinate system has attributes of a position, a scale (rate of scaling), rotation, and opacity.

In more detail, the anchor point shows a position and a direction of the origin of the local coordinate system concerning the ornament. The values set to fields of "position", "scale", and "rotation" indicate the position, the scale (rate of scaling), and the rotational degree of the actual image on the coordinate system that the anchor point has (that is the local coordinate system).

In an example (ornament information no. 2) shown in FIG. 10 (*b*), the ornament information consists of the ornament image data and a mask data, where the ornament image data is related to the mask data.

In this case, the "ornament image data" is data displayed as a background, and the "mask data" indicates a size and positional relationship of the data part of the background (shaded area) and the part in which the image of the face area appears (unshaded area).

In FIG. 1, an ornament arranging unit 8 defines the arrangement information of the ornament in accordance with the change of the body part area which the detecting unit 6 has detected.

When a maximum matching is obtained with one of the templates shown in FIG. 7, the detecting unit 6 detects the rotation amount of the body part area, the rotation being in-plane of the input image; and the ornament arranging unit 8 defines the arrangement information of the ornament in accordance with the change of the rotation amount which the detecting unit 6 has detected.

When a maximum matching is obtained with one of the templates shown in FIG. 8, the detecting unit 6 detects the rotation amount of the body part area, the rotation being off-plane of the input image; and the ornament arranging unit 8 defines the arrangement information of the ornament in accordance with the change of the rotation amount which the detecting unit 6 has detected.

A detailed processing of the ornament arranging unit 8 is explained later, citing several kinds of examples.

In FIG. 1, a composing unit 10 outputs an ornament-arranged input image, in which an ornament is arranged in the input image based on the arrangement information that the ornament arrangement unit 8 has defined. The ornament-arranged input image is once stored in an output image storing unit 11, and is outputted from the image output unit 3.

In order to perform displaying on a display device, the composing unit 10 generates image data in which an ornament is directly drawn to the input image (data form 1). As an image data for transmitting to a recording medium or to other communication devices, the composing unit 10 may preferably generate and transmit image data in which an input image is related to parameters in drawing the ornament (data form 2). According to the data form 2, the input image can be easily restored, and therefore it is advantageous. An explanation for the data form 2 will be supplied later.

In FIG. 1, an operation unit 12 is for a user to input operation information into the control unit 2.

Figure 2:
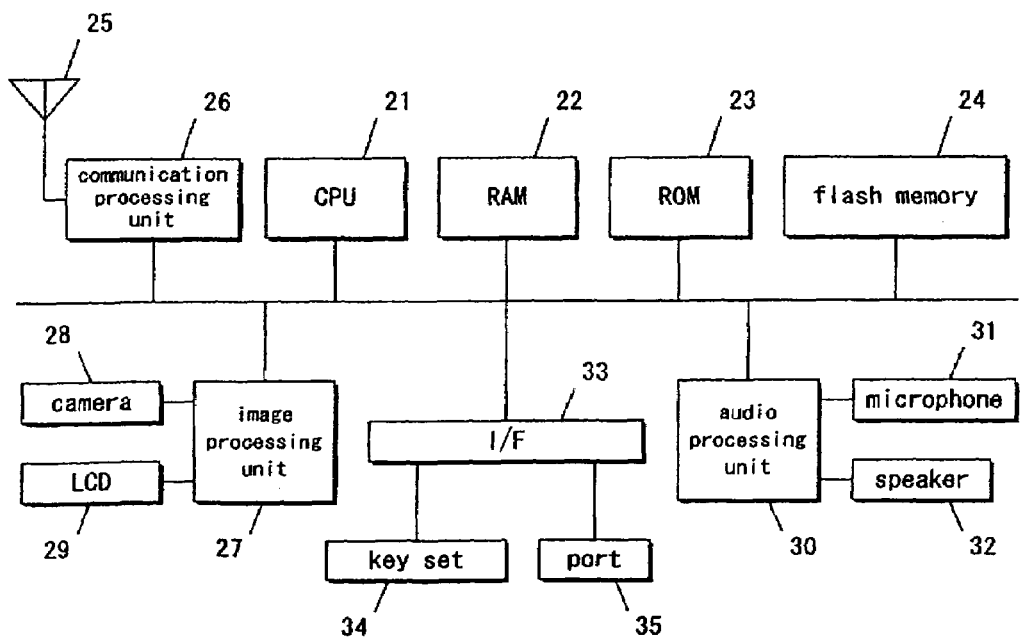
FIG. 2 is a block diagram illustrating the image processing apparatus according to the first embodiment of the present invention.

Next, construction examples for the image processing device shown in FIG. 1 and the pertaining peripheral parts are explained with reference to FIG. 2. FIG. 2 is a block diagram of the above-mentioned image processing apparatus.

The image processing apparatus shown in FIG. 2 exemplifies a camera-built-in cellular phone, in which the image processing apparatus shown in FIG. 1 is installed. As shown in FIG. 2, the camera-built-in cellular phone has the following elements.

A CPU 21 controls each element of FIG. 2 via a bus 20, and executes the control program that is recorded on a ROM 23 and follows the flowchart as shown in FIG. 5.

A RAM 22 secures a temporary storage area that the CPU 21 requires for processing. A flash memory 24 is a device equivalent to a recording medium.

Moreover, a communication processing unit 26 performs transmission and reception of data with an external communication device via an antenna 25.

An image processing unit 27 consists of an encoder/decoder for a coding system, such as MPEG; processes the image that a camera 28 has photographed, and controls the display state of an LCD 29 (an example of a display device) based on the image data that the CPU 21 has directed.

An audio processing unit 30 controls an audio input from a microphone 31, and an audio output via a speaker 32.

An interface 33 is connected to the bus 20. A user can input operation information by a key set 34 via the interface 33, and can connect the other devices via a port 35.

The function of the image input unit 1 is realized by a process in which the CPU 21 or the image processing unit 27 performs an operation for data recorded in the flash memory 24 or data obtained by photographing with the camera 28.

The functions of the control unit 2, the detecting unit 6, the ornament arranging unit 8 and the composing unit 10 are realized by processes in which the CPU 21 exchanges data with the RAM 22, the flash memory 24 and others, and in which the CPU 21 performs operation for the data.

Furthermore, the input image storing unit 4, the template storing unit 5, the ornament information storing unit 7, an arrangement information storing unit 9, and the output image storing unit 11 correspond to the storage areas secured by the RAM 22, the ROM 23 or the flash memory 24. The control unit 12 of FIG. 1 corresponds to the key set 34 of FIG. 2.

The CPU 21 performs recognition of the operation that a user performs on the key set 34, acquisition of the image from the camera 28, compression of a camera image and storage to the flash memory 24, loading and expansion of the storage image, image composition, image reproduction, and display on the LCD 29 and so on. The image processing unit 27 may perform some items of the above-described processing.

Figure 3:
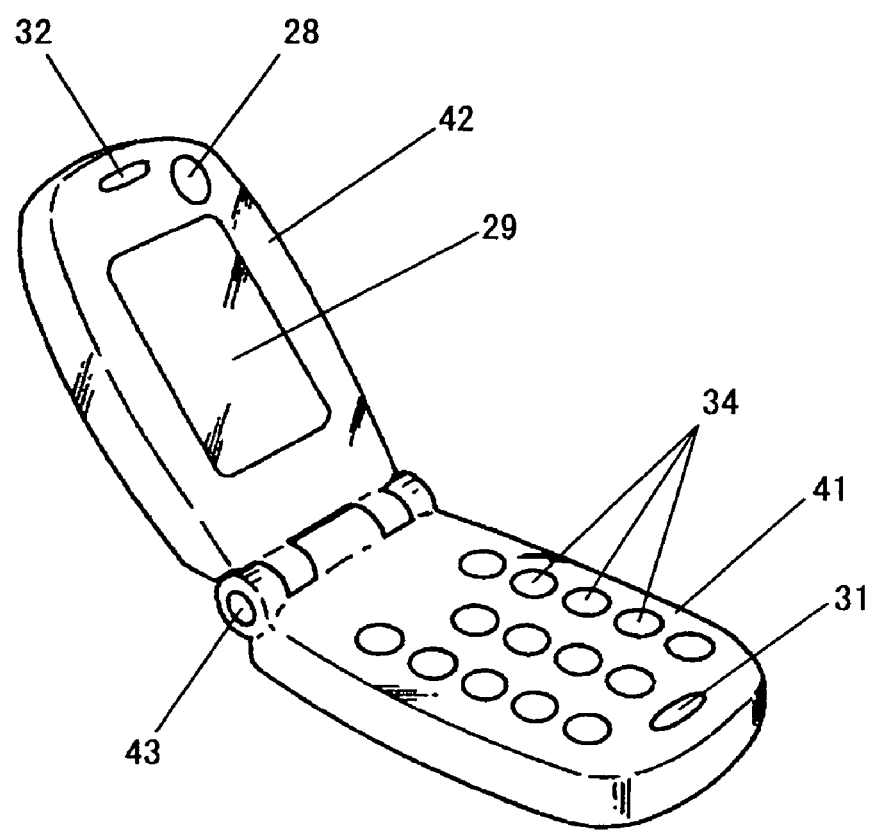
FIG. 3 is an illustration showing an outside view of the image processing apparatus according to the first embodiment of the present invention.

FIG. 3 indicates the outside (external) view of the image processing apparatus according to the present embodiment. As mentioned above, the image processing apparatus according to the present embodiment is installed in the camera-built-in cellular phone.

The camera-built-in cellular phone of FIG. 3 is a flip-open type, in which an upper casing 42 and a lower casing 41 are connected foldably by a joint portion 43. Needless to say, the appearance of the image processing apparatus is arbitrary, and the present invention can be applied to devices such as PDA other than cellular phones.

The explanation of the data form 2 is supplemented by referring to FIG. 4. Assume that an ornament (file name "star.swf") shown in FIG. 4 (*c*) is to be related with an input image (file name "face.rm") shown in FIG. 4 (*b*).

In this case, it is desirable to use the meta file in SMIL (Synchronized Multimedia Integration Language), as shown in FIG. 4 (*a*). In FIG. 4 (*a*), a line <video src="face.rm"> and a line <animation src="star.swf">, which are held between <par> and </par>, are simultaneously executed. After all, the input image of FIG. 4 (*b*) and the ornament of FIG. 4 (*c*) are composed at the time of a display.

In establishing a relationship such as the one shown in FIG. 4, it is not necessary to create a composite image itself of the input image of FIG. 4 (*b*) and the ornament of FIG. 4 (*c*).

Not only can the metafile in SMIL be used as described above, but also a file in XML (Extensible Markup Language) or an MP4 file and so on may also be used. When the data form 2 is used, it is sufficient that the input image and the ornament are related by a certain form.

Next, the flow of processing by the image processing apparatus according to the present embodiment is outlined with reference to FIG. 1, FIG. 5, and FIG. 12. It is assumed that the ornament information (part 1) indicated in FIG. 10 (*a*) is used.

In Step 1, the control unit 2 confirms whether or not the processing regarding all the frames that constitute a moving image has been completed. When the processing has completed, the processing is ended. When the processing is not completed, the processing moves to Step 2.

In Step 2, the image input unit 1 acquires the input image as shown in FIG. 12 (*a*), and the control unit 2 saves the input image in the input image storing unit 4.

In Step 3, the control unit 2 orders the detecting unit 6 to perform detection for the face area. Thereby, the detecting unit 6 detects the face area by using the template (FIG. 12 (*b*)) of the template storing unit 5.

In Step 4, the control unit 2 orders the ornament arrangement unit 8 to determine arrangement information. Thereby, the ornament arrangement unit 8 uses the ornament information of the ornament information storing unit 7, defines arrangement information, and saves the arrangement information in the arrangement information storing unit 9. Consequently, the ornament image on the ornament layer as shown in FIG. 12 (*c*) is acquired.

In Step 5, the control unit 2 orders the composing unit 10 to perform composition of the input image and the ornament image. Thereby, according to the ornament information saved in the ornament information storing unit 7, as shown in FIG. 12 (*d*), the composing unit 10 composes the ornament in the input image, and saves the resultant composite image in the output image storing unit 11.

In Step 6, the control unit 2 outputs the composite image of the output image storing unit 11 to the exterior (i.e. external to the image processing apparatus) via the image output unit 3.

The control unit 2 repeats steps after Step 1 until the processing of all frames is completed.

Next, an example of the composition of a user interface is explained with reference to FIG. 9. Here, the application chosen by the user is supposed to be image edit software, and is also supposed to be image composition mode that composes the ornament and the personal image photographed by the user.

Figure 11A:
FIGS. 11 (*a*) to (*c*) are illustrations showing three kinds of a display of a user interface according to the first embodiment of the present invention.
Figure 11B:
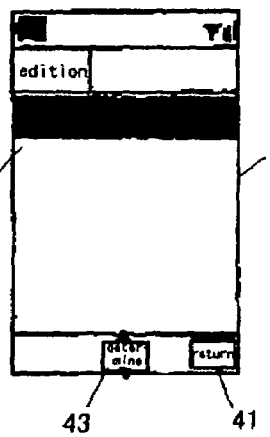
Figure 11C:
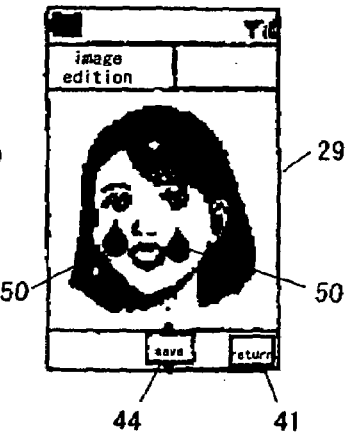
Figure 12A:
FIGS. 12 (*a*) to (*g*) are explanatory diagrams showing a process of the image processing apparatus according to the first embodiment of the present invention.
Figure 12B:
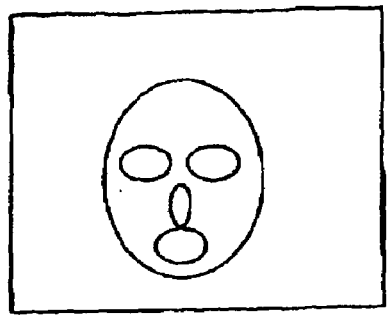
Figure 12C:
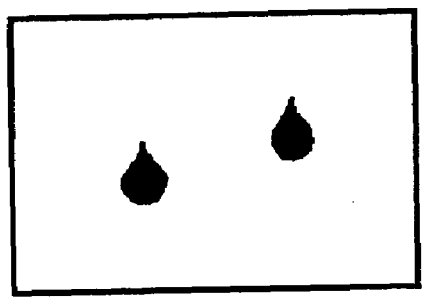
Figure 12D:
Figure 12E:
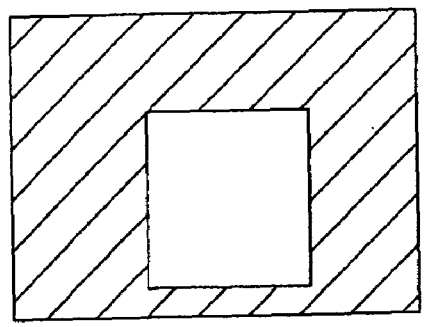
Figure 12F:
Figure 12G:

First, as shown in FIG. 11 (*a*), a personal image as the object to be edited is displayed on the LCD 29. An edit button 40 and a return button 41 are displayed as being attached to the personal image.

When a user chooses the edit button 40 with the key set 34, the list of the ornaments that can be inserted is displayed on the LCD 29, as shown in FIG. 11 (*b*).

When the user chooses the item "tears" and pushes a determination button 43, the face area of the personal image will be detected, the ornament arrangement information suitable for the face area will be searched for, the ornament "tears" will be added to the input picture according to the ornament arrangement information, and the result will be displayed on the LCD 29, as shown in FIG. 11 (*c*). In FIG. 11 (*c*), the ornament of tears 50 are added to the input picture. Here, the tears are inserted as a moving animation as well as a still image.

In the prior art, tears do not move and stay still where the tears are arranged.

Even if animation is inserted in the prior art, the movement of the teas in the animation is completely irrelevant to the movement of the personal image.

For example, in the prior art, tears keep running downward (even under the face), because tears are not automatically inserted right below the eyes, and tears are not automatically adjusted to stop running around the cheeks of the face. Moreover, when the face inclines or moves, the motion of the tears cannot be modified in accordance with the face.

On the other hand, according to the present embodiment, tears are designed to be automatically inserted right below the eyes, synchronizing with the movement of the body part area, because the location and size of the body part area (for example, the eyes within the face area in the present embodiment) are detected before tears are inserted. Moreover, the tears are able to follow the movement of the face.

Figure 13:
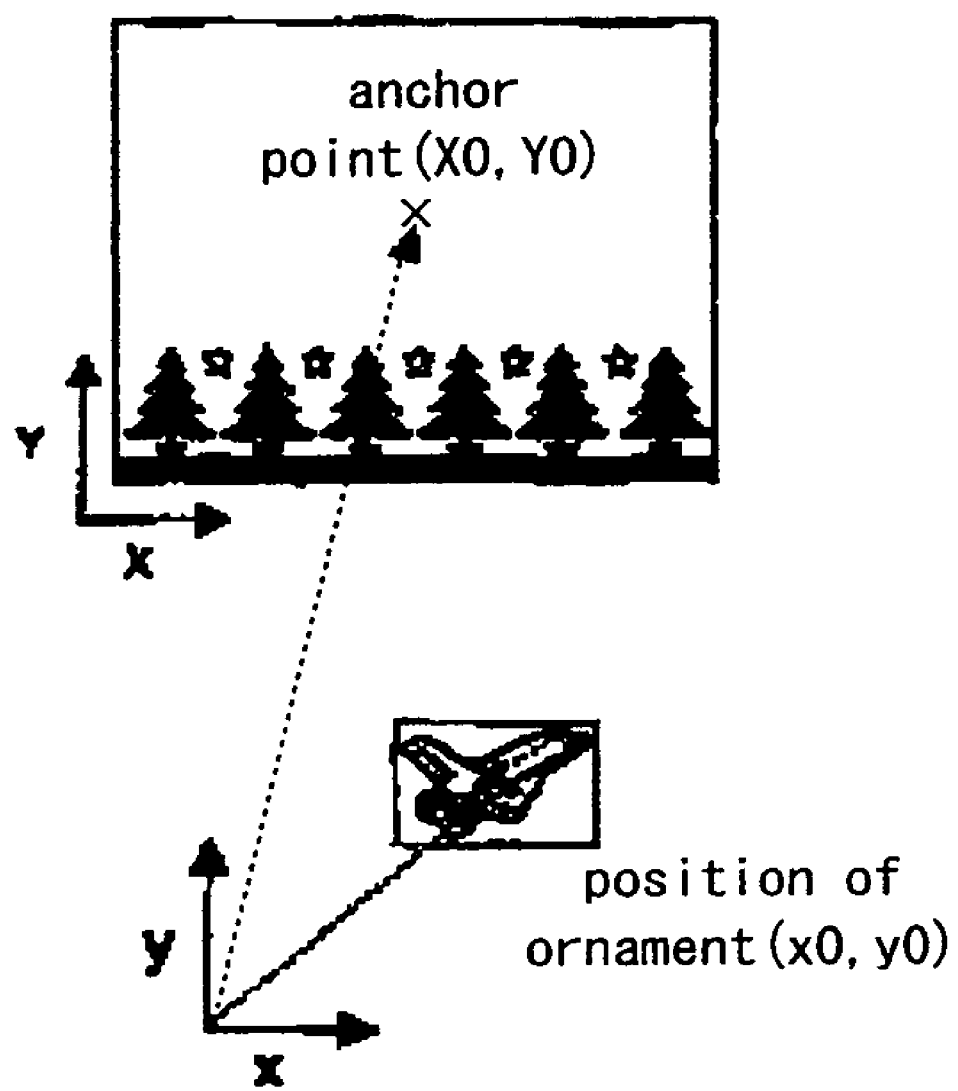
FIG. 13 is an explanatory diagram showing a coordinate system according to the first embodiment of the present invention.
Figure 14A:
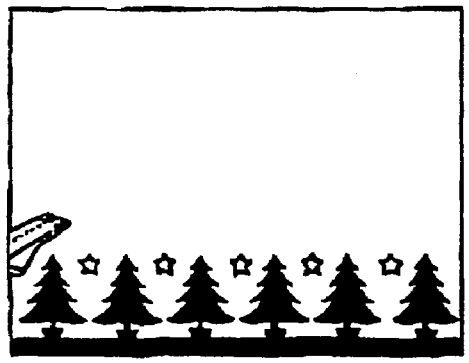
FIGS. 14 (*a*) to (*d*) are explanatory diagrams showing an animation according to the first embodiment of the present invention.
Figure 14B:
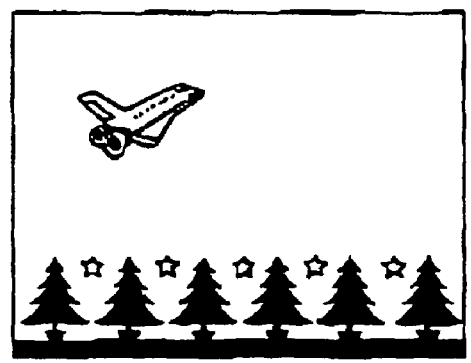
Figure 14C:
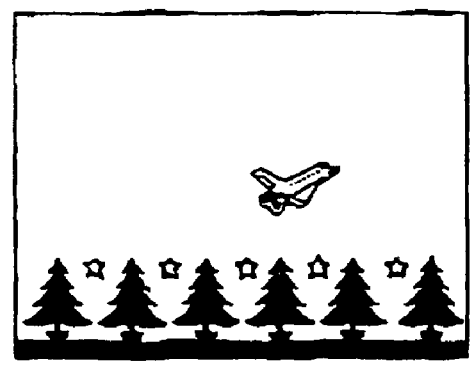
Figure 14D:
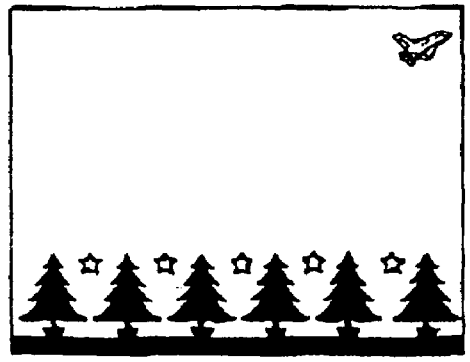

Hereinafter, the ornament arrangement information is further explained, while exhibiting application examples according to the present embodiment. FIG. 13 is an explanatory diagram illustrating an input image and a positional relationship of a coordinate system for the ornament image.

A procedure that creates general animation is briefly explained as supplement before explaining the application examples. Basically, the animation, in which the ornament moves, is created by moving an ornament layer that is related to the transform property.

Hence, in order to create animation, the attributes (position, rotation, etc.) of the transform are set to every key frame (existence located on a time-axis), and each value of the attributes is changed according to the passage of time. Here, the key frame means a frame to which the values of the position and other properties of the layer at a time of criterion are attributed. When there are two key frames (their positions on time axes naturally differ) that have different attribute values, for any frame located between the key frames in the time axes, each value of attributes can be determined by calculating a mean value regarding the frame. In short, animation can be created by repeating the operations of (1) creating the key frames and (2) setting up the move locus by interpolation between the key frames.

Next, the procedure of creating animation by the above-mentioned technique is explained with reference to the animation shown in FIG. 14 as the example. Here, as shown in FIGS. 14 (a) to (d), animation, in which an airplane flies from the lower left side to the upper right side, is created by changing the location, rotation, and scale of the layer.

In order to define the coordinate system that arranges an ornament layer, the anchor point of the coordinate system is set up first. In the example, as indicated in FIG. 13, the anchor point is set up at (X0, Y0), which is the center of the original image. It is also assumed that the directions of the coordinate axes are the same as the directions of the coordinate axes of the original image coordinate system.

The anchor point is assumed to be fixed to the last (end) of the animation. As a result, all values for the position and the rotation are decided on the coordinate system on which the anchor point is set.

Figure 15:
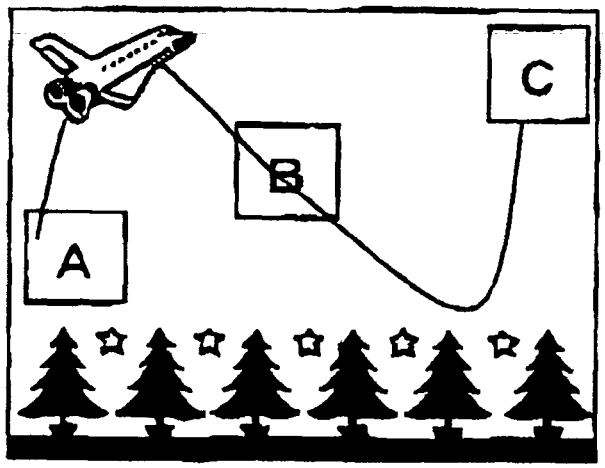
FIG. 15 is an explanatory diagram showing the animation according to the first embodiment of the present invention.

Next, the positions of the key frames and the move locus that connects the key frames are set up in the time axis. For example, as shown in FIG. 15, it is presupposed that the airplane is at point A in the first frame, then moves to point B after two seconds, and to point C after four seconds, and that the three points are connected with a curved line. Moreover, the rotation and the rate of enlargement and reduction are also set up to the three key frames that are the frames at the three points. A movement locus for a frame located between the key frames in the time axis is set up by the interpolation of the adjacent key frames. As a result, animation in which the airplane flies to the upper right corner can be created as shown in FIG. 14.

First Application Example

In the present example, after the position and range of the face part area are set up by template matching, the origin of the coordinate system (the anchor point) for the ornament is set at the point corresponding to the position of the face part area.

Figure 16A:
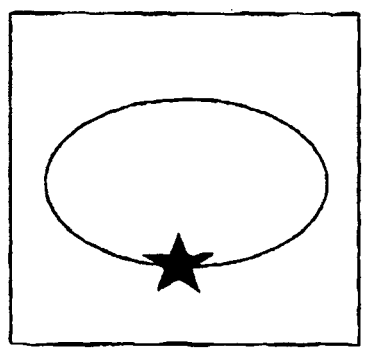
FIG. 16 (*a*) is an illustration showing an ornament according to the first embodiment of the present invention.
Figure 16C:
Figure 16B:
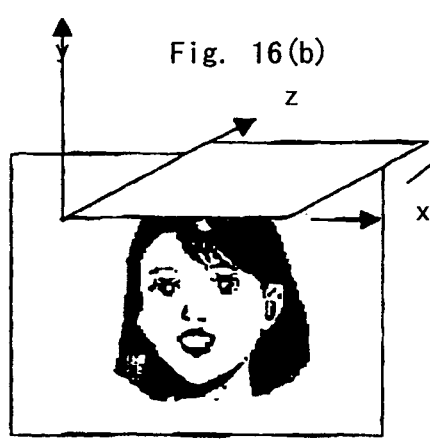

FIG. 16 (a) shows an ornament data. FIG. 16 (b) shows how the origin of the coordinate system (the anchor point) for the ornament is set at the head part of the face part area. The ornament depicts a partially elliptical orbit. FIG. 16 (c) shows the resultant composite image.

When the person's face part area is detected, as shown in FIG. 16 (b), the anchor point is correspondingly moved to the head part of the face part area. Moreover, when the size of the face area changes, the scale of the coordinate system for the ornament is changed in proportion to the size of the face area.

When the direction of the face part area changes, the direction of the axis of the coordinate system is changed to the direction that is the same direction as in the first set-up.

Thereby, even when a person moves relative to a photographing equipment, the ornament follows the movement of the person, always drawing an elliptical orbit on the head part.

Moreover, in a plurality of the face images photographed in different scenes, the ornament can be moved on the orbit, which is always proportional to the size of the head part, corresponding to each face position, range, inclination, and direction. As a result, it becomes more interesting.

Second Application Example

In the present example, the ornament information (part 2) is used, and the opacity of the ornament in the composite image frame is changed following the movement of the face area.

The present example uses the ornament information (part 2) shown in FIG. 10 (b). The processing of Steps 1 to 3 in FIG. 5 is performed in the same manner as the case where the ornament information (part 1) shown in FIG. 10 (a) is used.

However, the processing in Steps 4 to 6 is different. In Steps 4 to 6, by using the mask of FIG. 12 (e), a still image shown in FIG. 12 (f) is visibly arranged in the shaded area, and the image detected as the face area within the input image is pasted in the unshaded area, after adjusting the size of the image of the face area to the size of the unshaded area. After the processing, the resultant composite image is outputted.

Thus, the composite mask image with the still image as the background is used as the ornament arrangement information. According to the result of the face detection, the center of the composite mask image is arranged at the center of the face. The set-up of the opacity is controlled by the composite mask image when the still image and the input image are composed.

As a result, when composing with another image, the still image is prevented from overlapping with the face area.

Third Application Example

Figure 17:
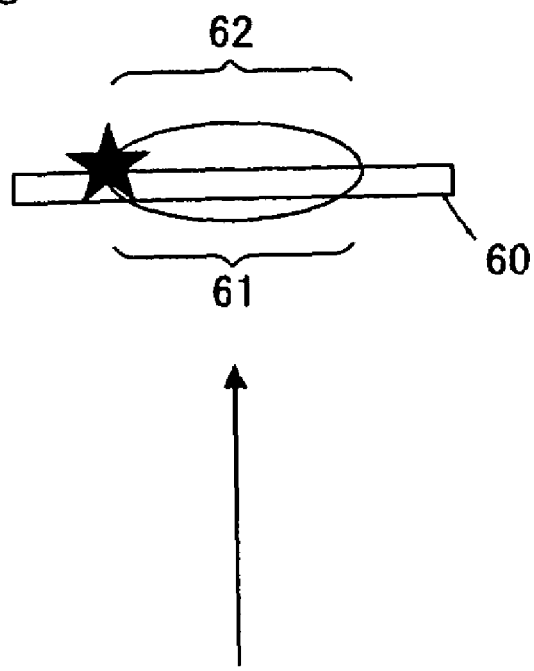
FIG. 17 is an illustration showing the ornament according to the first embodiment of the present invention.

In the present example, as shown in FIG. 17, the depth information (Z-axis) regarding a viewpoint is added to both of the input image and the ornament.

When the ornament is cut off in a virtual plane 60, which is equivalently the projection surface of the input image, the ornament is divided into a foreground area 61 that is located in the foreground side of the virtual plane 60, and a background area 62 that is located at the background side of the virtual plane 60.

Figure 18:
FIG. 18 is an illustration showing the composite image according to the first embodiment of the present invention.

Furthermore, the opacity of the foreground area 61 and the opacity of the background area 62 are changed, and the two areas 61 and 62 are composed. Thereby, as shown in FIG. 18, the animation, in which the star goes around the face, can be created.

It is necessary to intentionally set the anchor point so that the locus passes the face. By making the background 62 that passes through the back of the face transparent, the ornament having the three-dimension-like motion can be added.

Fourth Application Example

Figure 19:
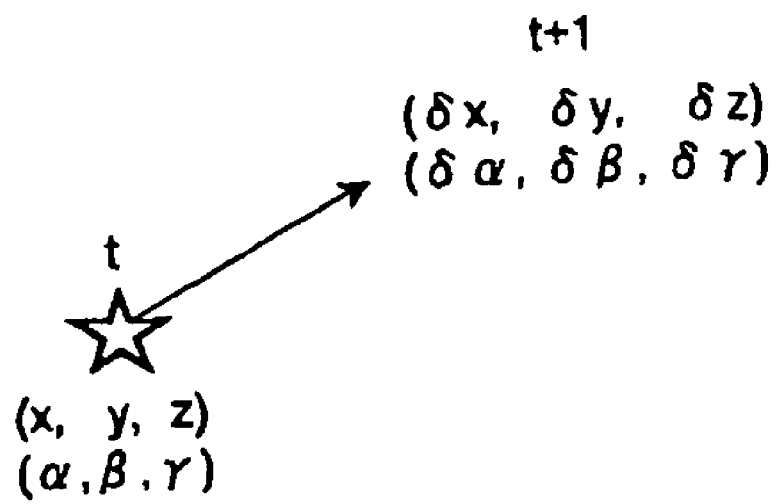
FIG. 19 is an illustration showing an ornament according to the first embodiment of the present invention.

In the present example, as shown in FIG. 19, the attribute (position and/or direction) of the ornament in the following frame is assumed by the attribute of the ornament in the present frame and a series of the attribute in several previous frames. For example, if the ornament is assumed to move at a constant and uniform speed, the attribute of the ornament can easily be assumed by a simple equation.

Furthermore, when the ornament overlaps with the body part area, the orbit of the ornament may be preferably changed. When plural ornaments are made to appear, each ornament is preferably allowed to move independently with each other.

Figure 20:
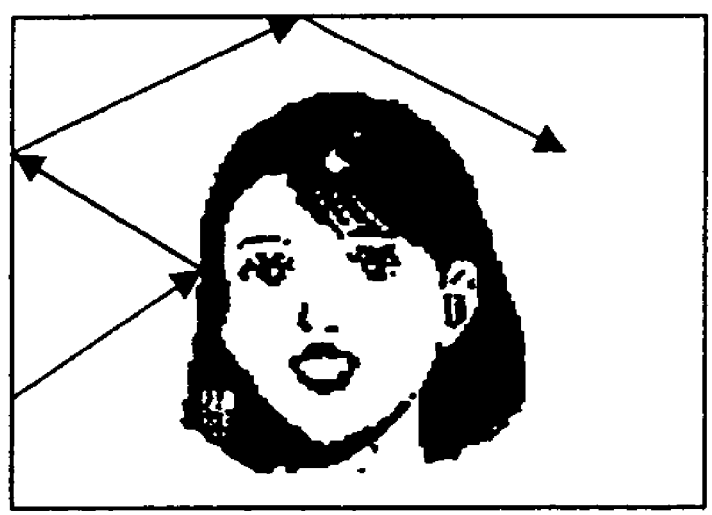
FIG. 20 is an illustration showing the composite image according to the first embodiment of the present invention.

In the present example, as shown in FIG. 20, when the ornament collides with the border line of the body part area or the input image, the moving direction of the ornament is changed so as to move the ornament away from the border line. Thereby, when the ornament collides with the body part area, a reflection-like motion can be given to the ornament. As a result, the composite image becomes more interesting.

According to the present invention, even if both a personal image and ornament image are moving, the ornament image can be designed not to interfere with the personal image, and therefore, the personal image can be clearly displayed. Moreover, the composite image can be made more interesting by synchronizing the movement of the ornament image with the movement of the personal image.

Having described preferred embodiments of the invention with reference to the accompanying drawings, it is to be understood that the present invention is not limited to those precise embodiments, and that various changes and modifications may be effected therein by one skilled in the art without departing from the scope or spirit of the invention as defined in the appended claims.

What is claimed is:

1. An image processing method comprising:
   detecting a position of a human body part area in an input image including a human body image;
   determining a point of origin of a local coordinate system of an ornament image having a move locus according to the detected position of the human body part area in the input image;
   determining arrangement information of the ornament image according to the determined point of origin and the move locus;
   generating an output image by composing the ornament image and the input image based on the determined arrangement information; and
   outputting the generated output image.

2. An image processing method as defined in claim 1, wherein said outputting comprises outputting an image data of the generated output image.

3. An image processing method as defined in claim 1, wherein said outputting comprises outputting an image data relating the ornament image to the input image.

4. An image processing method as defined in claim 3, wherein the ornament image and the input image are related by using a meta-file.

5. An image processing method as defined in claim 4, wherein a form of the meta-file is Synchronized Multimedia Integration Language.

6. An image processing method as defined in claim 1, wherein, when an ornament image collides with the human body part area, a moving direction of the ornament image is altered so as to move the ornament image away from the human body part area.

7. An image processing method as defined in claim 1, wherein the human body part area is a face part area of a person as a photographic object.

8. An image processing method comprising:
   detecting a size of a human body part area in an input image including a human body image;
   determining a scale of a local coordinate system of an ornament image having a move locus according to the detected size of the human body part area; input image; and
   determining arrangement information of the ornament image according to the determined scale of the local coordinate system of the ornament image and the move locus;
   generating an output image by composing the ornament image and the input image based on the determined arrangement information; and
   outputting the generated output image.

9. An image processing method comprising:
   detecting a rotation amount of a human body part area, the rotation being in-plane of an input image including a human body image;
   defining a rotation amount of a local coordinate system of an ornament image having a move locus according to the detected rotation amount of the human body part area;
   determining arrangement information of the ornament image according to the defined rotation amount of the local coordinate system of the ornament image and the move locus;
   generating an output image by composing the ornament image and the input image based on the determined arrangement information; and
   outputting the generated output image.

10. An image processing method comprising:
   detecting a rotation amount of a human body part area, the rotation being off-plane of an input image including a human body image;
   defining a rotation amount of a local coordinate system of an ornament image having a move locus according to the detected rotation amount of the human body part area;
   determining arrangement information of the ornament image according to the defined rotation amount of the local coordinate system of the ornament image and the move locus;
   generating an output image by composing the ornament image and the input image based on the determined arrangement information; and
   outputting the generated output image.

11. An image processing method comprising:
   detecting a human body part area in an input image including a human body image;

defining opacity of an ornament image having a move locus, the opacity of the ornament image in a foreground area of the ornament image with respect to the detected human body part area being different from the opacity of the ornament image in a background area of the ornament image with respect to the detected human body part area;

determining arrangement information of the ornament image according to the defined opacity of the ornament image and the move locus;

generating an output image by composing the ornament image and the input image based on the determined arrangement information; and outputting the generated output image.

12. An image processing apparatus comprising:

an input image storing unit operable to store an input image including a human body image;

a template storing unit operable to store at least one template of a human body part area;

a detecting unit operable to detect the human body part area out of the input image stored in said input image storing unit, said detecting unit being operable to use the at least one template of the human body part area stored in said template storing unit to detect the human body part area;

an ornament image information storing unit operable to store ornament image information; and an ornament arranging unit operable to define ornament arrangement information, in harmony with a change of the human body part area detected by said detecting unit.

13. An image processing apparatus as defined in claim 12, further comprising a composing unit operable to generate an output image by composing the ornament image and the input image, based on the ornament arrangement information defined by said ornament arranging unit.

14. An image processing apparatus as defined in claim 12, wherein:

said detecting unit is operable to detect a rotation amount of a human body part area, the rotation being in-plane of an input image; and said ornament arranging unit is operable to define ornament arrangement information, in harmony with a change of the rotation amount of the human body part area detected by said detecting unit.

15. An image processing apparatus as defined in claim 12, wherein:

said detecting unit is operable to detect a rotation amount of a human body part area, the rotation being off-plane of an input image, and said ornament arranging unit is operable to define ornament arrangement information, in harmony with a change of the rotation amount of the human body part area detected by said detecting unit.

16. An image processing apparatus as defined in claim 12, wherein the ornament image information comprises a transform property and ornament image data, the transform property being related to the ornament image data.

17. An image processing apparatus as defined in claim 12, wherein the ornament image information comprises mask data and ornament image data, the mask data being related to the ornament image data.

* * * * *

UNITED STATES PATENT AND TRADEMARK OFFICE
CERTIFICATE OF CORRECTION

| | | |
|---|---|---|
| PATENT NO. | : 7,133,658 B2 | Page 1 of 1 |
| APPLICATION NO. | : 10/698435 | |
| DATED | : November 7, 2006 | |
| INVENTOR(S) | : Kazuyuki Imagawa et al. | |

It is certified that error appears in the above-identified patent and that said Letters Patent is hereby corrected as shown below:

In Claim 8:
In column 14, lines 23-24, please replace "body part area; input image; and" with --body part area;--.

Signed and Sealed this

Twentieth Day of February, 2007

JON W. DUDAS
*Director of the United States Patent and Trademark Office*